Nov. 20, 1956     H. J. OLDER     2,770,999
AFTER-IMAGE APPARATUS
Filed Aug. 6, 1952
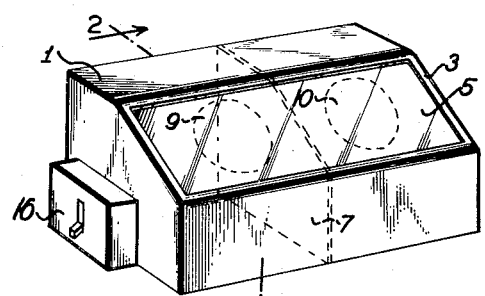
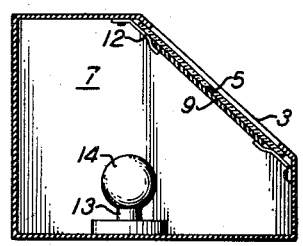
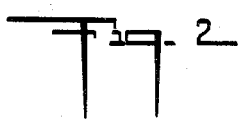
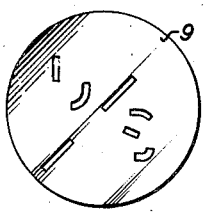 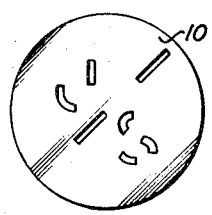 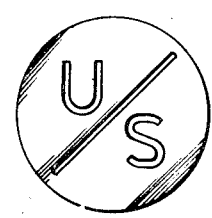
  
INVENTOR
HARRY J. OLDER
BY Robert U. Geib, Jr.
ATTORNEY

United States Patent Office 2,770,999
Patented Nov. 20, 1956

2,770,999

AFTER-IMAGE APPARATUS

Harry J. Older, Landover, Md.

Application August 6, 1952, Serial No. 302,860

2 Claims. (Cl. 88—20)

The present invention relates to the creation of visual effects, and more particularly to an apparatus for creating after-images.

There have heretofore been many proposals, in the fields of entertainment, advertising, etc., for creating attractive visual effects and, of course, the most successful of these have been those which are unusual, either in the results accomplished or the instrumentalities by which the results are obtained.

In a manner which will be described more specifically hereinafter, the present invention seeks to provide a visual effect which is sufficiently unusual to permit it to very effectively function in the fields of entertainment, advertising, etc.

As is well-known, when the human eye is stimulated intensely (for example, by the flash of a clear one-hundred watt electric light bulb), there is experienced a positive after-image of the stimulus. In the case of the light bulb, the subject sees the yellow filament as if it were projected onto the wall. The image may also be seen with the eyes closed. This positive image is due to continuation of receptor and neural processes after the stimulus has gone. It has the same color and brightness which existed when the stimulus was present. However, the positive after-image, even of an intense light, seldom lasts more than a few seconds. Most positive after-images are even more fleeting than this. In everyday life, such after-images are seldom experienced.

When the positive after-image of a light disappears, the negative after-image takes its place. This after-image is complementary to the stimulus in both hue and brightness. Thus, if the filament is bright yellow, the negative after-image is dark blue.

It is among the objects of the present invention to provide a negative after-image as described hereinbefore in a manner which is both novel and appealing, whereby it may be effectively used for such purposes as for entertainment, advertising, etc.

Another object is the attainment of the foregoing with the use of apparatus which is simple and inexpensive to manufacture, operate and maintain.

Still another object is the provision of apparatus of the type referred to immediately hereinbefore which also permits of the rapid and easy replacement of the after-image media per se.

With the foregoing and other objects in view, the invention further resides in the details of construction and arrangement of parts shown on the accompanying drawings. It is to be understood, however, that the present embodiment is shown for purposes of illustration only and not for the purpose of limiting the invention, as various changes will occur to persons skilled in the art, and all such modifications within the scope of the appended claims are contemplated.

In the drawings:

Figure 1 is a perspective of a form of apparatus which embodies the teachings of the present invention;

Figure 2 is a cross-sectional view, partly in elevation, taken on the line 2—2 of Figure 1;

Figures 3 and 4 are elevational views of a pair of stencils, the cut-out portions of which may be illuminated from the rear; said stencils being, in accordance with the teachings of the present invention, individually meaningless, but which, when successively viewed by an observer, will produce a significant and effective after-image; and Figure 5 is an elevational view representing the after-image which is the composite effect of the successively viewed light-stencils of Figures 3 and 4.

Referring more particularly to the drawings, the apparatus of the present invention comprises an exhibiting means which may acceptably take the form of a generally rectangular housing or cabinet, the top of which is indicated at 1. As shown in Figures 1 and 2, the top 1 and front of the generally rectangular housing may be modified to provide a sloping or oblique section 3 through which the display media may be conveniently viewed by an observer. More specifically, the sloping or oblique viewing section 3 of the housing 1 supports a panel 5 which is transparent, at least in part, and which may, if desired, be formed entirely of ground glass.

The housing or cabinet 1 is transversely divided by a translucent panel 7 which, in effect, also transversely divides the oblique viewing panel 5 into two sections, each of which is adapted to receive a stencil member, as shown at 9 and 10. As before mentioned, the stencil members 9 and 10 are provided with such cut-out portions that render them individually meaningless, but which, when the stencil members are axially aligned, produce a significant composite result. This will be readily understood after viewing the individual stencils 9 and 10 as shown in Figures 3 and 4, and the composite effect of their alignment as viewed in Figure 5.

The stencil members 9 and 10 are respectively supported by fingers 12 in the left-hand and right-hand horizontally aligned compartments of the housing or cabinet 1, behind the oblique viewing panel 5.

Within each of the two horizontally aligned compartments of the housing or cabinet 1 is a light fixture and electric light bulb, as shown at 13 and 14, respectively. It is, of course, essential to the attainment of the visual effects described earlier herein that the electric light bulbs 13 and 14 be of such size and power as to produce light of suitable intensity.

Referring again to Figure 1, the numeral 16 generally designates a combined electrical switch and timer which may be one of a number of commercially available types and which, as such, forms no part of the present invention. This combined electric switch and timer 16 is so constructed and arranged that, upon being turned on, it illuminates first one and then the other of the electric light bulbs 13 and 14, with a suitable interval of darkness after the illumination of the second bulb, if such is desired. In any event, I have discovered that, if one of the electric light bulbs is illuminated for an interval of between five and seven seconds and then turned-off, with the other light bulb 14 immediately illuminated for a corresponding period and then turned-off, a very good composite after-image is obtained when the observer looks at a suitable background, such as the sky, a blank wall, etc.

Suitable directions may be conveniently displayed to enable the observer to quickly understand that the stencil members 9 and 10 are to be successively viewed during their brief periods of illumination from the rear with the after-image taking place shortly thereafter.

It is also contemplated that more than two stencil members be utilized to obtain a composite after-effect in which case the earlier stencil member or members of the series be of increased intensity or duration in order to prolong the pattern to such an extent as to enable the blending thereof with the pattern or patterns of the succeeding stencil members.

I am aware that it has heretofore been proposed in the field of amusement devices to employ a stencil through which the eyes may be focused onto a source of light, such as the sun, and thereafter provide an after-image of the stencilled area upon a suitable background, such as the sky or a blank wall. When using such devices, the observer is, at the outset, clearly apprised of the form the after-image will take, as distinguished from the device of the present invention which perserves an aura of mystery through the successive use of several after-image media which are individually meaningless, but which combine to provide a significant and effective single after-image.

Having now described my invention and in what manner the same may be used, what I claim as new and desire to protect by Letters Patent is:

1. Apparatus for producing a predetermined and definitely intelligible visual after-image resulting from a continuation of receptor and neural processes after the discontinuance of a stimulus to the human eye, said apparatus comprising a pair of opaque panel areas having target openings for the penetration therethrough of light rays, a light source behind each of said opaque panel areas, said opaque panel areas being adjacently disposed whereby they may be successively viewed by an observer, the target openings in each of said opaque panel areas being arranged in a pattern which produces unintelligible indicia when said panels are viewed individually, but being so constructed with respect to each other that, when said panel areas are viewed in sequence, the target openings therein thereafter present an intelligible indicia due to said after-image effect.

2. Apparatus for producing a predetermined and definitely intelligible visual after-image resulting from a continuation of receptor and neural processes after the discontinuance of a stimulus to the human eye, said apparatus comprising a cabinet, said cabinet being divided into at least two side-by-side compartments, an opaque panel area in front of each of said compartments, each of said opaque panel areas having target openings for the penetration therethrough of light rays, a light source in each of said compartments, the light-penetrable target openings in each of said opaque panel areas being arranged in a pattern which produces unintelligible indicia when said panels are viewed individually, but being so constructed with respect to each other that, when said panel areas are viewed in sequence, the target openings therein thereafter present an intelligible indicia due to said after-image effect, and means for successively activating each of said light sources for a sufficient period of time to produce an after-image of the light-penetrable target openings in each of said opaque panel areas.

References Cited in the file of this patent

UNITED STATES PATENTS

| | | |
|---|---|---|
| 1,454,127 | McLean et al. | May 8, 1923 |
| 1,479,098 | James | Jan. 1, 1924 |
| 1,591,969 | Freeman | July 13, 1926 |
| 1,630,281 | Tillyer | May 31, 1927 |
| 1,673,113 | Gehring | June 12, 1928 |
| 1,918,298 | Taylor | July 18, 1933 |

OTHER REFERENCES

Helmholtz' Physiological Optics Translated by Sonthall, 1924, vol. 11, pages 211, 212, 233, 234 and 266.